United States Patent
Forbes

[15] 3,670,167
[45] June 13, 1972

[54] PROXIMITY SWITCHING EQUIPMENT

[72] Inventor: Norman Arthur Forbes, Louisville, Ky.
[73] Assignee: American Standard Inc., New York, N.Y.
[22] Filed: May 14, 1970
[21] Appl. No.: 37,077

[52] U.S. Cl. ................................. 250/221, 4/99, 4/249, 250/237 R
[51] Int. Cl. ........................................... H01j 39/12
[58] Field of Search ............ 4/99, 100, 249; 250/221, 237 R; 251/129; 340/258 B, 280

[56] References Cited

UNITED STATES PATENTS

| | | | |
|---|---|---|---|
| 3,329,946 | 7/1967 | Robbins | 340/258 B |
| 3,457,423 | 7/1969 | Gravely | 340/280 X |
| 3,480,787 | 11/1969 | Johansen | 250/221 |
| 2,014,174 | 9/1935 | Francis | 340/258 B |
| 2,438,207 | 3/1948 | Derby | 250/221 X |
| 2,738,448 | 3/1956 | Bokser | 250/221 X |
| 2,442,690 | 6/1948 | Hoffman et al. | 250/237 X |

Primary Examiner—William F. Lindquist
Attorney—Jefferson Ehrlich, Tennes I. Erstad and Robert G. Crooks

[57] ABSTRACT

Covers equipment for a plumbing fixture, such as a wash basin, lavatory, etc., employing a photo-conductive cell structure mounted within a view tube pointed in the direction of the user of the plumbing fixture. The photo cell structure will recognize or respond to the presence or absence of a user in the vicinity of the plumbing fixture. The cell may act as a trigger or switch to initiate the operation of the plumbing fixture to transmit water therethrough and then control apparatus to shut off the flow of water to the plumbing fixture after the user has removed his hands from the wash basin or has removed himself from the view of the photo cell structure.

12 Claims, 7 Drawing Figures

PATENTED JUN 13 1972 3,670,167

INVENTOR.
NORMAN A. FORBES
BY
ATTORNEY 3,670,167
FIG. 5
FIG. 4
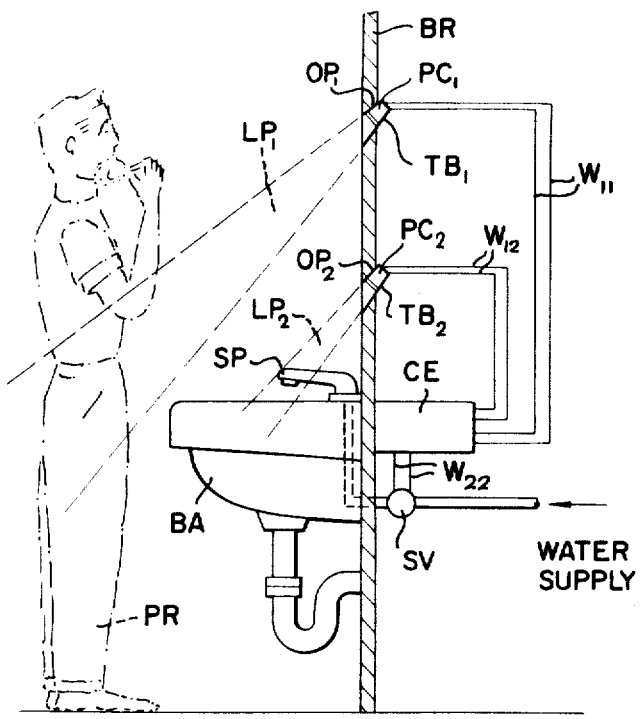
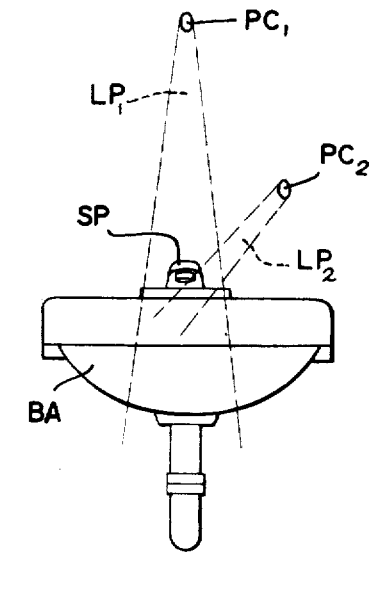
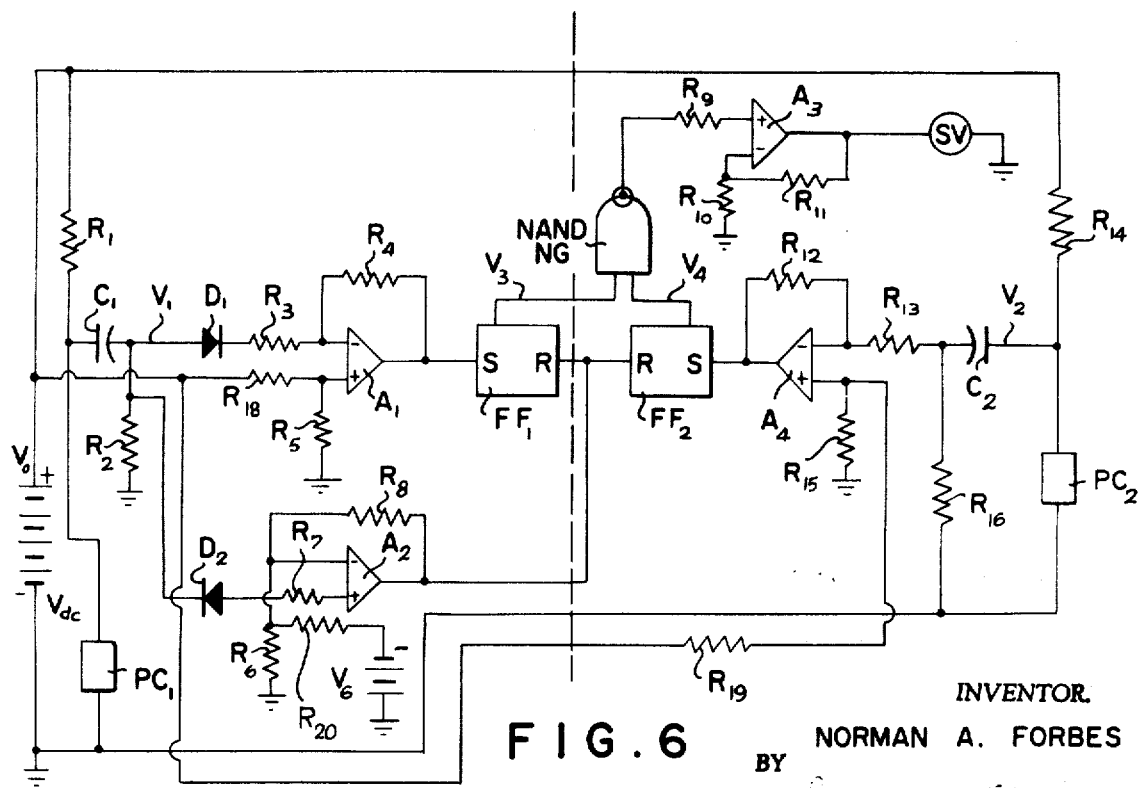
FIG. 6
INVENTOR.
NORMAN A. FORBES
BY
ATTORNEY

PROXIMITY SWITCHING EQUIPMENT

So-called proximity structures have heretofore been proposed for sensing the presence of a user in the vicinity of the plumbing fixture, such as a wash basin or lavatory, for controlling the operation of the plumbing fixture. The antenna structure is usually coupled to a circuit which directly or indirectly operates a solenoid valve to control the flow of water to and through the plumbing fixture. The antenna structure of the proximity equipment was provided to sense the relatively small increase in capacitance that accompanies the approach of the user to the antenna structure. Such an antenna structure, although quite efficient and suitable for many purposes, nevertheless has certain inherent limitations or disadvantages. One of the disadvantages is that the change in capacitance that must be sensed by the antenna structure is typically very small, such as 1 picofarad. Such a small capacitance, if it is sensed properly and free of transient effects, requires a circuit that is quite sensitive and complex and expensive. Another disadvantage is that the antenna structure must be relatively large in size even to exhibit the small capacitance change produced in response to the advent of the user. Another disadvantage is that even a large plate antenna is often unable to sense the presence of a user at distances which are greater than about 1 foot from the region of the antenna of the plumbing fixture.

Furthermore, the antenna and its incidental structure usually has to be built into the plumbing fixture and, at the same time, concealed from public view. Such structures, therefore, did not lend themselves very well to the bulk of situations in which existing plumbing facilities had to be improved or modernized to operate automatically and efficiently.

In accordance with the present invention, a photo-conductive cell structure is employed as a trigger or switching device. It may be positioned within a so-called view tube, which may be cylindrical in shape, preferably having a parallel wall, and may be positioned in the wall adjacent to the plumbing fixture where it can be concealed and yet easily installed and repaired. The inner wall of the view tube is preferably coated with an essentially non-reflective substance such as black paint, so that the photo cell structure will be unable to respond significantly to reflected or ambient light except along a fairly well defined cone of view. When inserted in a wall adjacent to the plumbing fixture, the photo cell structure will "look" through the opening of the view tube and promptly respond to the variations in the light reaching the tube opening and serve to determine whether or not a person is in position before the plumbing fixture or has departed therefrom. The view tube significantly can look down, almost vertically, at the person, so that the view tube may receive appreciable reflected ambient light from the floor under normal conditions when the user is not in front of the fixture.

When the user moves into the critical sensing position before the plumbing fixture in the disclosed embodiment of this invention, the amount of light reaching the photo cell structure will be substantially reduced since the photo cell receives relatively little light by reflection as it looks down at the essentially vertical front surface of the user. On the other hand, when the user leaves the scene of the sensing position, the ambient light reaching the photo cell structure along the cone of view will return to its former value. Thus, the photo cell structure responds to the substantially large changes in the amount of impinging light on account of the presence or the absence of the user in the key sensing position. This substantial change in the light magnitude impinging upon the photo cell structure may be used to promptly control the current flow through a resistor or the charge applied to a capacitor or the current through any other impedance and thereby alter the voltage or other property developed across the resistor or the capacitor or other impedance to a very different value, perhaps double the normal value. These significant changes in the voltage across the resistor or other impedance may be used to operate the control circuit which, in turn, will control the operation of, for example, the solenoid valve of the plumbing fixture and control the water flow to the plumbing fixture.

Thus, according to this invention, a substantial change in voltage will be generated across the resistor or other impedance when the user reaches the scene of the photo cell structure so that the solenoid valve may then operate to initiate and control the flow of water through the plumbing fixture, whether it be a lavatory or a wash basin or any like fixture. The voltage change may be effected in either direction, as may be desired. Similarly, a voltage change may be effected in either direction, as may be desired, to turn the water off when the user leaves the scene.

The arrangement of this invention, as will be more clearly apparent from the description hereinafter following, differs from other photo electric detectors used for other purposes in which light from a lamp is caused to travel as a beam and continuously shine against the photo cell structure and in which the user is expected to "break" the light beam between the source of light and the photo cell structure to "recognize" and respond to the presence of the user and operate the equipment to be controlled by the photo cell structure. This type of prior installation, with its beamlike characteristics, usually requires the presence of two opposing walls or other surfaces providing a single path between the lamp or other light source mounted on one wall and the photo sensitive device mounted on the other wall, and the user must pass through this path so that the presence or absence of the user may be sensed by the photo cell structure by the breakage of the beam of light between the two walls. This sort of installation usually requires a light source having a relatively high intensity so as to overcome or minimize the effect of ambient light. In such an arrangement, moreover, because of its dependence upon a large volume of continuous light, the lamp or other source of light may be burned out and hence require repeated replacement. The installation problems, as well as the maintenance difficulties with the various parts of the equipment, have heretofore served to limit the use of such prior photo cell structures. According to the present invention, such difficulties and disadvantages have been virtually eliminated.

This invention, together with its objects and features, will be better and more clearly understood from the more detailed description and explanation hereinafter following, when read in connection with the accompanying drawing in which FIG. 1 schematically illustrates a plumbing fixture, such as a wash basin or a lavatory, together with the photo-electric structure and the allied control and timing equipment required in the installation and use of one form of the invention.

FIG. 4 illustrates another modification employing two photo cell structures, one for viewing the approach and departure of the user and the other for viewing the position of the hands of the user.

FIG. 5 illustrates a front view of the basin or lavatory schematically illustrated in FIG. 4.

FIG. 6 illustrates a schematic diagram of electronic circuitry which may be employed in connection with the arrangements of FIGS. 4 and 5.

The same or similar reference characters will be employed throughout the drawing to illustrate the same or similar parts wherever they may occur in the drawing.

Figure 1:
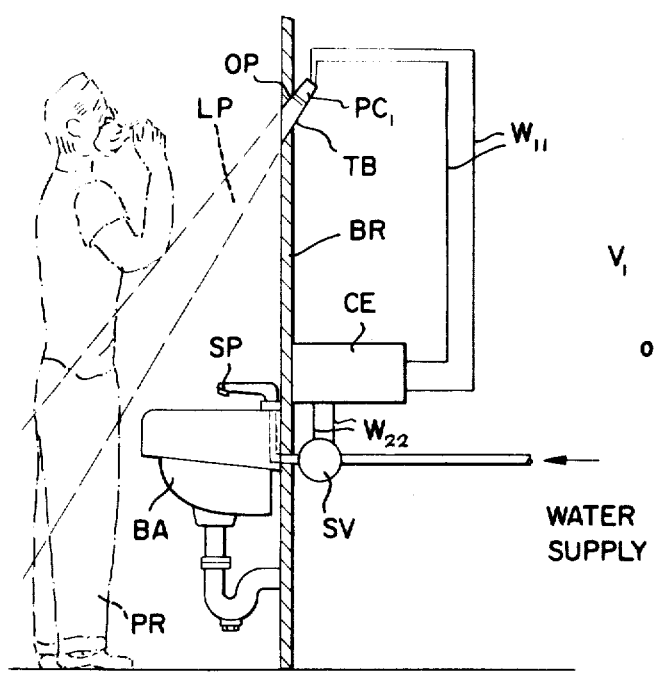

Referring to FIG. 1 of the drawing, there is shown a schematic illustration of one form of the invention. Here a photo cell $PC_1$ and a solenoid valve SV are to be coupled to each other through a control equipment CE for the control of the flow of water through a basin or lavatory BA. The photo cell $PC_1$ is preferably mounted and fixed within a tube TB which may be rectangular or cylindrical or ellipitical in cross-section and the cell $PC_1$ may be positioned at the upper or smaller end of the tube TB. The solenoid valve SV will control the flow of water to the plumbing fixture BA. That is, the water will be turned on by the solenoid valve SV when the user arrives in front of the plumbing fixture, and it will be turned off when the user departs therefrom. The tube TB may be positioned in an opening OP of a wall or barrier BR so that the photo cell can "observe" the presence or absence of the user, designated PR for particularity and clarity, in front of the plumbing fixture BA. The photo cell may be connected by wires $W_{11}$ to the control equipment CE, which is shown in greater detail in FIG. 2, and the control equipment CE is in turn connected to the solenoid valve by means of another pair of wires $W_{22}$ for the control of the solenoid valve.

Figure 2:
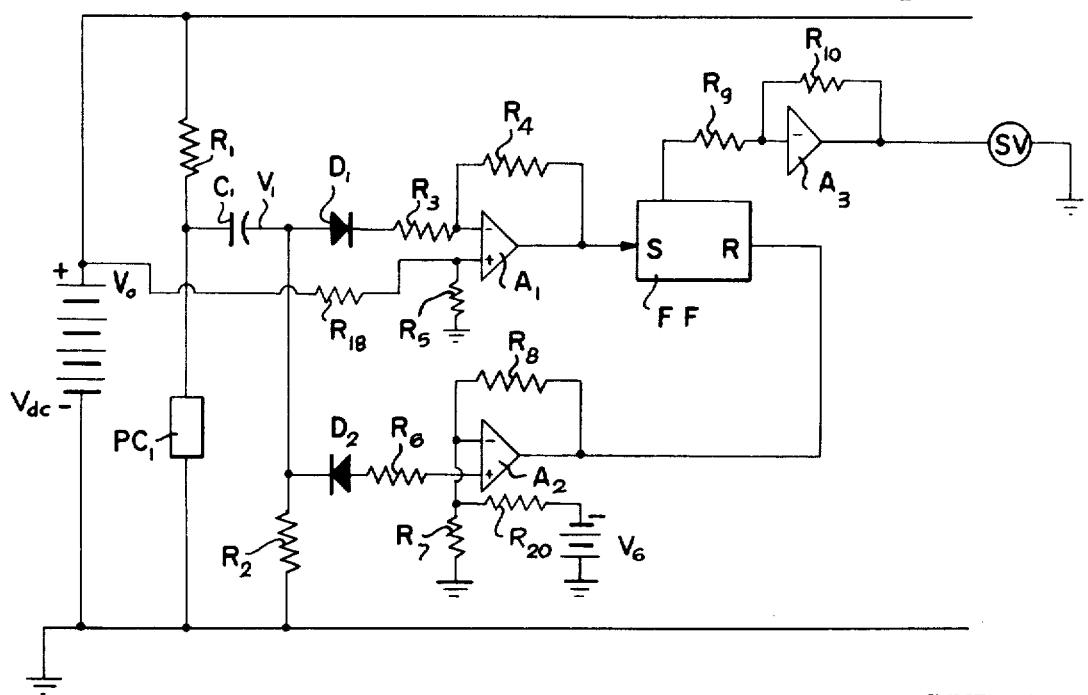
FIG. 2 shows a schematic circuit diagram which may be employed for the interconnection of the photo-conductive cell structure and the solenoid valve equipment to operate the solenoid valve equipment in the arrangement of FIG. 1.

Referring now to FIG. 2, there is shown a schematic circuit diagram of the control equipment which may be used, for example, for the operation of the solenoid valve SV which, as already explained, may be associated with the plumbing fixture BA of FIG. 1, which may be a lavatory or wash basin. FIG. 2 includes a source of DC voltage $V_0$, which may be a battery or a series of batteries, or a rectified source of DC voltage derived from a conventional AC power source. The photo cell is designated $PC_1$ and it is connected to the resistor $R_1$ so that the combination will be bridged across the source of voltage $V_0$ as shown and constitute a voltage divider. Any substantial change in the amount of light impinging upon the photo cell $PC_1$, such as would occur when a person comes within the range LP of the viewing cone or cylinder LP of the tube TB of FIG. 1, or when the user leaves the scene of the viewing cone or cylinder LP, will have a distinct, real effect upon the impedance of the photo cell $PC_1$. Thus, before a user arrives at the scene LP, the photo cell $PC_1$ will exhibit a fairly low or minimum impedance and, at the same time, the capacitor $C_1$ will be charged to a correspondingly low voltage dependent upon the then impedance of photo cell $PC_1$. When the user arrives at the scene LP, the impedance of the cell $PC_1$ will rise and thereby increase the voltage developed across the photo cell. This increased voltage will be relayed through resistor $R_2$ to the capacitor $C_1$. On the other hand, when the user leaves the scene LP of the photo cell $PC_1$, the voltage across the cell will decrease to its approximate former value, which may be half its value when the user was present at the scene LP, thereby reducing the voltage charge across the capacitor $C_1$. Hence, the capacitor $C_1$ follows the voltage across the photo cell $PC_1$ and yields a pulse or pulses which may be employed to initiate and terminate the operation of the solenoid valve SV as will be further and more fully explained.

Figure 3:
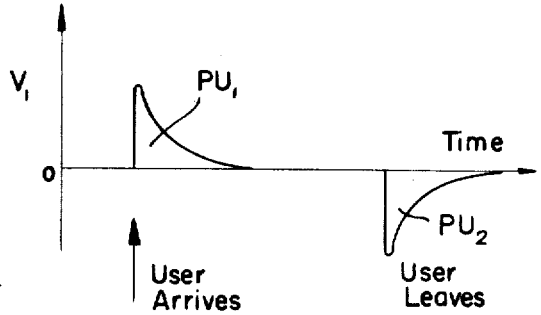
FIG. 3 illustrates a voltage-time diagram for explaining the voltage changes employed in the invention set forth in FIG. 1

As already noted, the arrival of the user at the scene LP in front of the plumbing fixture BA will not only increase the impedance of, and the voltage across, the photo cell $PC_1$, but also increases the voltage charge on capacitor $C_1$, perhaps doubling its voltage. The development of the increased voltage produces a positive transient voltage. This transient voltage is shown as a positive pulse $PU_1$ in FIG. 3. This pulse will travel through a diode $D_1$ and resistor $R_3$ to amplifier $A_1$. Amplifier $A_1$ is an inverting amplifier which renders the positive pulse negative at the output of amplifier $A_1$. This negative pulse will reach the set terminal S of the flip-flop FF which may be of any conventional or well known type. One such flip-flop is available as RCA model CD2304. The flip-flop FF, which previously had a zero output voltage, will then relay this condition as a positive DC voltage through the resistor $R_9$ to another amplifier $A_3$. The amplifier $A_3$ is an inverting amplifier and the output of the amplifier $A_3$ will therefore feed a negative voltage through the solenoid valve SV.

The solenoid valve SV will then be opened in the usual or conventional manner to deliver water through spout SP to the plumbing fixture BA to be used by the user PR. The amplifier $A_3$ will continue to transmit current to solenoid valve SV to maintain the solenoid valve SV operated continuously provided the user remains in position within the scene LP of the photo cell $PC_1$.

When the user leaves the scene LP, the amount of light reaching the photo cell $PC_1$ will be increased, thereby reducing the impedance of the photo cell. Consequently, a negative transient voltage will be developed across resistor $R_2$. This negative transient pulse is designated $PU_2$ in FIG. 3. This negative transient voltage will be fed through diode $D_2$ and resistor $R_6$ to another amplifier $A_2$ which is not of the inverting kind. This negative pulse, after amplification by amplifier $A_2$, will reach the reset terminal R of the flip-flop FF, and change the positive voltage applied to terminal R to a negative voltage. As the voltage on terminal R goes through zero, the flip-flop FF will change state and its output will go to zero. When this happens, the current previously delivered by amplifier $A_3$ will be interrupted, whereupon the solenoid valve SV will be closed. This will stop the flow of water through the solenoid valve via the spout SP of the plumbing fixture BA.

The arrangement of FIGS. 1 and 2 requires the presence of the user in the arena LP before the plumbing fixture BA will trigger the solenoid valve SV to initiate the flow of water whether or not the user desires to use the oncoming water. Thus, if the user merely adjusts his tie, or combs his hair, etc., the water will nevertheless flow through the spout SP. This may result in wastage of water and otherwise be unsatisfactory in certain circumstances. The flow of water through spout SP will be maintained for an interval substantially equal to the abscissa or time spacing between pulses $PU_1$ and $PU_2$ of FIG. 3. The water flow can be interrupted only upon the departure of the user from the scene LP of FIG. 1.

In order to overcome the limitations of FIGS. 1 and 2, the arrangements of FIGS. 4, 5 and 6 may be employed. As can be seen from FIGS. 4 and 5, two photo-electric cells PC1 and PC2 are employed, each of which may be inserted in its own individual tube $TB_1$ and $TB_2$, these cells being electrically effective within the respective arenas $LP_1$ and $LP_2$. Both tubes $TB_1$ and $TB_2$ may be mounted in a common wall BR, as shown, so arranged that the tube $TB_1$ will be pointed and directed toward the user PR and the tube $TB_2$ will be pointed and directed toward the basin of the lavatory BA. Thus, one tube and its photo cell will be directed to one part of the user's body and the other tube and its photo cell will be directed at another part of the user's body.

It may be stated at the outset that in the illustrative arrangements of FIGS. 4, 5 and 6, the user PR is required to be in the arena $LP_1$ and his hands or arms are required to be within the arena $LP_2$ before the solenoid valve SV will be operated. The control equipment CE, which is shown in FIG. 6, is arranged so that, unless both arenas $LP_1$ and $LP_2$ are appropriately occupied, the solenoid valve SV will not be operated.

FIG. 6 shows a schematic of the electronic equipment suitable for this modification. The equipment on the left of the dotted line corresponds generally to the like equipment of FIG. 2, and is controlled by the first photo cell $PC_1$, while the equipment at the right of the dotted line represents additional equipment which is controlled by the second photo cell $PC_2$ and is joined to the equipment controlled by photo cell $PC_1$ for the simultaneous control of the solenoid valve SV.

It will be apparent from the arrangement of FIG. 2 that, when the user PR has arrived and is in position before the plumbing fixture BA, a negative voltage will be applied to the set electrode S of the flip-flop, FF1, so as to change the state of flip-flop FF1 and activate this flip-flop. In FIG. 6, this will yield a condition during which a zero voltage will be applied by flip-flop $FF_1$ to the left input terminal $V_3$ of the NAND gate NG.

However, when one or both of the user's hands or arms are placed beneath the spout SP of the plumbing fixture BA, the amount of light reaching the photo cell $PC_2$ will decrease. This will increase the voltage applied to capacitor $C_2$ through resistor $R_{16}$. This increased voltage will develop a positive transient voltage which will be transmitted through resistor $R_{13}$ to the inverting amplifier $A_4$. Amplifier $A_4$ momentarily establishes a zero voltage at the set electrode S of the second flip-flop $FF_2$ at the zero cross-over point. This will change the state of flip-flop $FF_2$. By virtue of the connection of the flip-flop $FF_2$ to the right input terminal $V_4$ of the NAND gate NG, there will also be a zero voltage applied to the right hand input terminal $V_4$ of the NAND gate NG. The NAND gate NG being of a conventional type, the absence of voltage at both of these input terminals $V_3$ and $V_4$ will cause it to supply a positive voltage through its output terminal through resistor $R_9$ to the amplifier $A_3$. Amplifier $A_3$ will transmit amplified current through solenoid valve SV to operate the solenoid valve. Water will then be transmitted through the spout SP into the basin of the fixture BA.

Thus, the arrival of the user at the fixture BA produces a condition in which the left input terminal $V_3$ of the gate NG may go to zero voltage. Moreover, the presence of the user's hands under the spout SP likewise develops a condition in which the right input terminal $V_4$ of the gate NG also may go to zero voltage. When both input terminals $V_3$ and $V_4$ are simultaneously at zero voltage, the NAND gate NG will transmit a positive voltage through its output terminal which will trigger amplifier $A_3$ and operate the solenoid valve SV.

When the solenoid valve SV has been operated, as already explained, it will continue operated even though the user may remove his hands from the arena $LP_2$ of the second photo cell $PC_2$. In other words, any change in the impedance of the second photo cell $PC_2$ will be ineffective to close valve SV after it has been opened.

However, when the user leaves the arena $LP_1$, a negative voltage will then appear, as already explained, at the output of the amplifier $A_2$, which is not an inverting amplifier, and this negative voltage will be applied to flip-flop $FF_1$ to reset terminal R of flip-flop $FF_1$. A positive voltage was previously applied to the terminal $V_4$ of the NAND gate NG as soon as the user's hands left the scene $LP_2$ of the second photo cell $PC_2$. Hence, when the user has left the premises, both input terminals $V_3$ and $V_4$ of the NAND gate NG will be positive, thereby causing the gate NG to remove the previously established positive voltage at its output terminal. This will remove the voltage supplied to amplifier $A_3$, thereby cutting off the flow of current through solenoid valve SV. Thus, the flow of water from the spout SP will be stopped.

It will be observed that, in FIG. 6, there are two similar voltage divider circuits, $R_1$–$PC_1$ and $R_{14}$–$PC_2$, two similar inverting amplifiers A1 and A4, and two similar flip-flops $FF_1$ and $FF_2$ which control the common NAND gate NG. The NAND gate can be triggered to operate the solenoid valve SV only after both voltage divider circuits have been activated by the photo cell $PC_1$ and $PC_2$ which are "observing" the arenas $LP_1$ and $LP_2$. The solenoid valve will continue to operate until the user PR has left the scene of the arena $LP_1$.

The cylindrical or rectangular or other shaped tubes $TB_1$ and $TB_2$ enclose photo cells $PC_1$ and $PC_2$ which are exposed to narrow beams of light within their respective arenas $LP_1$ and $LP_2$. Each photo cell so oriented can be made effective over a longitudinal path extending over 10 feet or more. Each of the tubes $TB_1$ and $TB_2$ is preferably internally painted or otherwise coated with a dark material, such as black paint, so that the ambient light in the room or vicinity of the plumbing fixture BA will have little effect upon either photo cell except for light reflected along the sensitive areas $LP_1$ and $LP_2$. The control system is not sensitive to the degree of illumination in the room since it responds essentially to transient changes to the light reaching the photo cell. This condition of the photo cells will remain unchanged even when positioned within a highly illuminated room in which the plumbing fixture BA is installed. Each photo cell is sufficiently sensitive so that, as an object, such as a person, comes into the range of the arenas $LP_1$ and $LP_2$, the respective photo cells will be promptly responsive and undergo a large increase in impedance, as already indicated, to control and trigger the equipment.

Each photo cell may be any appropriate well known or conventional photo-electric structure that responds to varying light effects. Elements of cadmium sulphide and cadmium selenide are suitable for use in the throat of the $TB_1$ and $TB_2$ tubes as appropriate sensing and switching elements.

Figure 7:
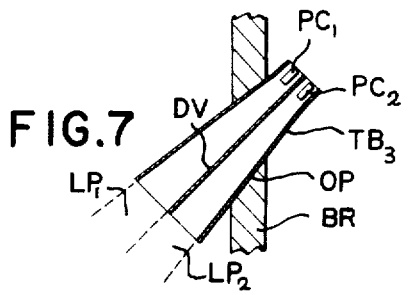
FIG. 7 illustrates a combination tube arrangement for supporting two photo cell structures.

Although FIGS. 4, 5 and 6 show two photo cells $PC_1$ and $PC_2$ mounted within two respective tubes $TB_1$ and $TB_2$, a single tube $TB_3$ structure may be provided, as shown in FIG. 7, for both photo cells. The tube divider DV separates the areas of both cells. One of the cells $PC_1$ may view one part of the region or room where the fixture BA is located, i.e., the area to which the user advances to use the fixture BA, while the other cell $PC_2$ may view another part of the region, such as the bowl of the fixture BA, where the hands of the user are positioned when the spout SP is to be used.

The photo cells $PC_1$ and $PC_2$, when enclosed within corresponding tubes $TB_1$ and $TB_2$ as described, may be employed, for example, to control apparatus CE to detect the arrival of an uninvited guest, such as a burglar, into the vestibule of a building. The control apparatus CE of FIGS. 1 and 2 may operate a signal or other equipment to notify others of the arrival. The photo cells $PC_1$ and $PC_2$ of FIGS. 4, 5 and 6, for example, may be similarly employed to detect the arrival of an uninvited guest. One photo cell $PC_1$ may be activated when the person enters the vestibule while the second photo cell $PC_2$ is activated when, for example, the hand of the person reaches into an adjacent space. One tube $TB_1$ will cover the first arena (the vestibule), while the second tube $TB_2$ covers the second arena (the adjacent space). The control equipment CE may be employed to operate an alarm or a camera or both (and so on).

Sources of DC voltage for the structures such as the amplifiers, flip-flops and the NAND gate have not been shown so as to avoid unnecessary complexity that might confuse the reader.

While this invention has been shown and described in certain particular arrangements for illustration and explanation, it will be understood that the structures and illustrations included in this application may be applied to other and widely varied organizations without departing from the spirit and scope of this invention.

What is claimed is:

1. Control apparatus for a plumbing fixture comprising two hollow tubes positioned remote from the plumbing fixture and each housing a photo-electric structure, one of the tubes being pointed directly toward the basin of the plumbing fixture, the other of the tubes being pointed toward the area adjacent the plumbing fixture so that the photo-electric structure therein will respond to the approach of a user, means for operating the plumbing fixture only when both photo-electric structures have been operated, and means for releasing the plumbing fixture only when the user has departed from the plumbing fixture.

2. Control apparatus according to claim 1 including switching mechanism controlled by the photo-electric structures.

3. Apparatus for operating the solenoid valve of a plumbing fixture, comprising means for generating two sequential pulses of different polarities to control the operation and release of said solenoid valve, photo-electric structure positioned remote from the plumbing fixture but pointed toward the plumbing fixture means responding to the advent of one part of the user's body in the arena of the photo-electric structure to change the impedance of said photo-electric structure to cause said generating means to produce one of said pulses and responding to the advent of another part of a user's body in the arena of the photo-electric structure to cause said generating means to produce the other of said pulses.

4. Apparatus according to claim 3 including means to prevent any substantial change in the impedance of the photo-electric structure except in response to the advent of either of said parts of the user's body.

5. The method of operating a plumbing fixture only when a person is prepared to use the fixture, which consists in exposing a first photo-electric device to ambient light for producing a first photo-electric effect upon the entrance of the person into a predetermined arena closely adjacent the front of the fixture, exposing a second photo-electric device to ambient light for producing a second photo-electric effect when the hand of said person has entered a second predetermined closely adjacent arena, and transmitting water through the fixture only upon the simultaneous production of both photo-electric effects.

6. The method of operating a plumbing fixture according to claim 5, including the step of stopping the flow of water through the plumbing fixture only upon the removal of the person from the first arena.

7. The method of operating a plumbing fixture according to claim 5, including the step of stopping the flow of water only upon the removal of the person from both arenas.

8. The method of automatically operating a plumbing fixture only when a person is in position to use the fixture which consists of exposing a first photo-electric device to ambient light for producing a first photo-electric effect immediately upon the entrance of the person into a first arena in front of said fixture, exposing a second photo-electric device to ambient light for producing a second photo-electric effect when a limb of said person has entered a second but adjacent arena in front of said fixture, operating the fixture to deliver water only in response to the simultaneous production of both photo-electric effects, and releasing the flow of water through the fixture only when the person has left the first arena.

9. The method of operating a plumbing fixture according to claim 8 which includes the step of preventing the flow of water through the fixture upon the removal of the limb of the person from the second arena while the person remains in the first arena.

10. Protection apparatus for a plumbing fixture comprising a photo-cell structure positioned within a tube which is pointed toward a predetermined protection area and is exposed only to ambient light, means for generating a first pulse when one section of the protection area is invaded and a second pulse when a second section of the protection area is invaded, and means responsive to the simultaneous generation of both pulses to produce a signal for transmitting water through the plumbing fixture.

11. Protection apparatus for a plumbing fixture according to claim 10 including means to de-activate the signal upon the removal of the invasion from the protection area to stop the flow of water through the plumbing fixture.

12. Protection apparatus for a plumbing fixture according to claim 10 in which the tube is divided into two segments and the photo cell structure is composed of two photo cells, one cell being positioned in one segment of the tube and another cell in the other segment of the tube.

* * * * *